(12) United States Patent
Brenner

(10) Patent No.: US 12,520,384 B2
(45) Date of Patent: Jan. 6, 2026

(54) EXHAUST-GAS HEATER

(71) Applicant: Purem GmbH, Neunkirchen (DE)

(72) Inventor: Holger Brenner, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 682 days.

(21) Appl. No.: 17/828,704

(22) Filed: May 31, 2022

(65) Prior Publication Data

US 2022/0386419 A1     Dec. 1, 2022

(30) Foreign Application Priority Data

May 31, 2021    (DE) ...................... 10 2021 113 989.9

(51) Int. Cl.
| | |
|---|---|
| *H05B 1/02* | (2006.01) |
| *F01N 3/20* | (2006.01) |
| *F01N 9/00* | (2006.01) |
| *G05D 23/24* | (2006.01) |

(52) U.S. Cl.
CPC ......... *H05B 1/0236* (2013.01); *F01N 3/2013* (2013.01); *F01N 9/00* (2013.01); *G05D 23/24* (2013.01); *F01N 2900/0602* (2013.01); *H05B 2203/022* (2013.01); *H05B 2203/035* (2013.01)

(58) Field of Classification Search
CPC ............ H05B 1/0236; H05B 2203/022; H05B 2203/035; H05B 3/06; H05B 2203/003; H05B 3/03; H05B 3/10; H05B 3/22; F01N 3/2013; F01N 9/00; F01N 2900/0602; F01N 2240/16; F01N 2900/1404; F01N 3/027; G05D 23/24
See application file for complete search history.

(56) References Cited

U.S. PATENT DOCUMENTS

| | | | |
|---|---|---|---|
| 8,444,729 B2* | 5/2013 | Bailey | B01D 46/2411 422/177 |
| 9,958,336 B2* | 5/2018 | Ihle | G01K 7/223 |
| 2002/0172258 A1* | 11/2002 | Adachi | H01C 1/14 374/185 |
| 2008/0028753 A1* | 2/2008 | Wagner | F01N 3/0238 60/295 |
| 2014/0000245 A1 | 1/2014 | Harada et al. | |
| 2014/0343747 A1* | 11/2014 | Culbertson | F01N 3/2013 700/300 |
| 2017/0254242 A1* | 9/2017 | Swanson | F01N 3/2006 |
| 2019/0155230 A1* | 5/2019 | Culbertson | F01N 3/208 |
| 2019/0234266 A1 | 8/2019 | Bartolo et al. | |
| 2019/0331015 A1 | 10/2019 | Naumann et al. | |
| 2020/0174505 A1 | 6/2020 | Culbertson et al. | |
| 2021/0106981 A1* | 4/2021 | Upadhyaya | B01J 23/83 |

(Continued)

FOREIGN PATENT DOCUMENTS

| | | |
|---|---|---|
| DE | 10 2019 101 603 A1 | 8/2019 |
| DE | 10 2020 123 376 A1 | 3/2022 |

(Continued)

*Primary Examiner* — Matthew T Largi
(74) *Attorney, Agent, or Firm* — Walter Ottesen, P.A.

(57) ABSTRACT

An exhaust-gas heater for an exhaust system for an internal combustion engine includes a heating conductor with a first supply-voltage terminal, a second supply-voltage terminal and a heating region extending between the first supply-voltage terminal and the second supply-voltage terminal. A voltage-measuring section is integrated into the heating region.

10 Claims, 4 Drawing Sheets

(56) References Cited

U.S. PATENT DOCUMENTS

| 2021/0372314 A1 | 12/2021 | Weigl et al. |
| 2022/0074333 A1 | 3/2022 | Hoeckel et al. |

FOREIGN PATENT DOCUMENTS

| EP | 3 423 685 B1 | 1/2019 |
| EP | 3 424 265 B1 | 1/2019 |
| JP | S51-120446 A | 10/1976 |
| JP | S54-137141 A | 10/1979 |
| JP | 60-78918 U | 6/1985 |
| JP | 07-064418 A | 3/1995 |
| JP | 2010-229978 A | 10/2010 |
| JP | 2014-008914 A | 1/2014 |
| JP | 2020-537078 A | 12/2020 |

* cited by examiner

EXHAUST-GAS HEATER

CROSS REFERENCE TO RELATED APPLICATION

This application claims priority of German patent application no. 10 2021 113 989.9, filed May 31, 2021, the entire content of which is incorporated herein by reference.

TECHNICAL FIELD

The present disclosure relates to an exhaust-gas heater for an exhaust system for an internal combustion engine, and also to an exhaust-gas heating system constructed with such an exhaust-gas heater, and to an exhaust system with such an exhaust-gas heater or exhaust-gas heating system. The disclosure further relates to a method for operating such an exhaust-gas heater.

BACKGROUND

From US 2022/0074333 (the entirety of which is incorporated by reference herein) an exhaust-gas heater is known that exhibits a heating conductor with a heating region, extending between two supply-voltage terminals, around which exhaust gas is capable of flowing in an exhaust system. The heating conductor of the exhaust-gas heater has been provided by being cut out from a metallic flat material. As a result of application of an electrical voltage between the supply-voltage terminals and as a result of the electric current flowing between the supply-voltage terminals when the electrical voltage is applied, heat arises by reason of the heating power defined substantially by the product of electrical voltage and electric current, the heat being transferred at least partially to the exhaust gas flowing around the heating conductor or the heating region thereof.

SUMMARY

An object of the present disclosure is to provide an exhaust-gas heater and a method for operating an exhaust-gas heater, with which an improved adaptability of heating operation to ambient conditions—such as, for example, the temperature of exhaust gas flowing around the heating conductor—can be obtained.

In accordance with the disclosure, this object is achieved by an exhaust-gas heater for an exhaust system for an internal combustion engine. The exhaust-gas heater includes a heating conductor with a first supply-voltage terminal, with a second supply-voltage terminal and with a heating region extending between the first supply-voltage terminal and the second supply-voltage terminal, further including a voltage-measuring section integrated into the heating region.

Through the provision of such a voltage-measuring section on the heating conductor or, to be more exact, on the heating region of the heating conductor, the possibility is created of ascertaining the temperature in the region of the voltage-measuring section by tapping or registering the electrical voltage falling along the voltage-measuring section, by reason of the generally known relationship between the electrical voltage and the electrical resistance and also by reason of the generally known relationship between the electrical resistance and the temperature of the voltage-measuring section, and consequently also of ascertaining the temperature of the heating region, which in principle can also be assumed to correspond substantially to the temperature of the voltage-measuring section. Consequently information can be provided about the temperature of the heating conductor in the region of the heating region of the heating conductor that is flowed around or capable of being flowed around by exhaust gas. Consequently there is the possibility of bringing the temperature of the heating conductor into a desired range, or of keeping it within the range of a set value, by varying the supply voltage and hence also varying the heating power arising at the heating conductor.

In a configuration that is particularly easy to realize, the voltage-measuring section may encompass a portion of the heating region. This means that the measuring voltage is tapped directly on the heating region or between two voltage-measuring terminals provided on the heating region, and consequently information about the temperature of the heating region can be provided directly in the longitudinal portion of the heating region providing the voltage-measuring section.

In an alternative configuration, the voltage-measuring section may include a measuring resistor, a first terminal region of the measuring resistor being coupled to a first heating-region portion leading to the first supply-voltage terminal, and a second terminal region of the measuring resistor being coupled to a second heating-region portion leading to the second supply-voltage terminal, the measuring resistor being electrically connected in series with the first heating-region portion and with the second heating-region portion. In this configuration, the heating conductor has been interrupted in the region of the voltage-measuring section, so that two heating-region portions of the heating region are present, physically separated from one another by the voltage-measuring section but connected to one another in electrically conducting manner via the section. The integration of such a measuring section in the form of a measuring resistor, implemented as a separate component, into the heating conductor, or into the heating region thereof, offers the possibility of using a material for the measuring resistor that, within the operating-temperature range to be taken into consideration—that is, the temperature range within which such an exhaust-gas heater is generally operated, enables an exact registration of the measuring voltage or an exact ascertainment of the electrical resistance and consequently also of the temperature that is present in the region of the measuring section.

In another alternative configuration, the measuring section integrated into the heating region may include a measuring resistor extending along a portion of the heating region. Also in this configuration there is the possibility of employing particularly suitable material for the measuring resistor without interrupting the heating conductor or the heating region and consequently of being unable to utilize a longitudinal portion thereof for the thermal interaction with exhaust gas.

In order to be able to utilize the measuring resistor particularly efficiently for registering a fall in voltage, in the case where the measuring resistor is electrically connected in series with the first heating-region portion and with the second heating-region portion it is proposed that a first voltage-measuring terminal has been formed on the measuring resistor in the region of the first terminal region, and a second voltage-measuring terminal has been formed on the measuring resistor in the region of the second terminal region.

In the case of a measuring resistor extending along a portion of the heating region, the measuring resistor may be in heat-transfer contact with the heating region substantially in its entire longitudinal region extending between a first voltage-measuring terminal and a second voltage-measuring terminal. This ensures that the measuring resistor has a temperature corresponding to the temperature of the heating region by reason of its existing thermal contact with the heating region.

For increased accuracy in the registration of the electrical voltage falling between the voltage-measuring terminals, the voltage-measuring section may exhibit a resistance characteristic differing from the resistance characteristic of the heating region. This offers, in particular, the possibility of using a construction material for the heating conductor, or for the heating region thereof, that, within the temperature range in which such an exhaust-gas heater, or the heating conductor thereof, is generally operated, exhibits only a comparatively low dependence of the electrical resistance on the temperature.

Within such an operating-temperature range the voltage-measuring section may advantageously exhibit an electrical resistance changing in more intensely temperature-dependent manner than the heating region. This means that a magnitude of a gradient of a resistance/temperature relationship in the case of the voltage-measuring section is greater than in the case of the heating conductor. Alternatively or additionally, such different resistance characteristics may provide that the voltage-measuring section exhibits a lower electrical resistance than the heating region within the operating-temperature range. This ensures that, by reason of the lower electrical resistance, a slighter fall in voltage will occur in comparison with the heating region and, correspondingly, also a lower heating power will arise in the measuring section, so the temperature thereof may have been determined primarily by the temperature of the heating region in heat-transfer contact with the measuring section.

In a particularly advantageous configuration, exhibiting an intense temperature dependence of the electrical resistance, the voltage-measuring section may exhibit a PTC resistance characteristic or an NTC resistance characteristic. Such resistance characteristics are distinguished in that—unlike in the case of metals, for example—they exhibit not a linear but rather an exponential relationship between temperature and electrical resistance within a temperature range that is particularly relevant for the operation of an exhaust-gas heater. This means that even comparatively small changes in temperature bring about a considerable change in the electrical resistance capable of being registered by tapping an electrical voltage. The use of construction material with a PTC resistance characteristic offers the further advantage, particularly when the voltage-measuring section is connected in series with the heating conductor, that with the exponential rise in the electrical resistance at comparatively high temperatures a self-regulating effect of the heating power, and consequently an overheating protection for the heating conductor, can be provided.

The disclosure further relates to an exhaust-gas heating system for an exhaust system for an internal combustion engine, including at least one exhaust-gas heater through which exhaust gas is capable of flowing and with a structure according to the disclosure, and a control arrangement for registering a measuring voltage between a first voltage-measuring terminal and a second voltage-measuring terminal and for applying a supply voltage between the first supply-voltage terminal and the second supply-voltage terminal as a function of the registered measuring voltage.

The control arrangement may have been configured to apply the supply voltage to be applied between the first supply-voltage terminal and the second supply-voltage terminal as a function of the registered measuring voltage and of a set measuring voltage or of a set temperature in the region of the measuring section. A voltage control can accordingly be provided that ensures that a temperature of the measuring section, ascertained on the basis of the registered measuring voltage—that is, an actual voltage—lies within the range of a set temperature or fluctuates around the latter, depending on the control strategy, and consequently deviates from the set temperature only to an extent substantially dependent on the specified control strategy. The set temperature, or the set measuring voltage corresponding to a certain set temperature, may, for example, be predetermined in a manner dependent on ambient parameters such as, for example, the temperature of exhaust gas flowing through the exhaust-gas heater.

The disclosure further relates to an exhaust system for an internal combustion engine, including an exhaust-gas heating system with at least one exhaust-gas heater constructed in accordance with the disclosure.

The object stated in the introduction is further achieved by a method for operating an exhaust-gas heater constructed in accordance with the disclosure, preferentially in an exhaust-gas heating system with at least one exhaust-gas heater constructed in accordance with the disclosure or in an exhaust system containing such an exhaust-gas heating system, including the following measures:

a) applying a supply voltage between the first supply-voltage terminal and the second supply-voltage terminal, b) registering a measuring voltage between a first voltage-measuring terminal and a second voltage-measuring terminal, c1) comparing the measuring voltage registered in the course of measure b) with a set measuring voltage for the purpose of ascertaining a voltage deviation between the registered measuring voltage and the set measuring voltage, and setting the supply voltage as a function of the voltage deviation in such a manner that the registered measuring voltage lies within the range of the set measuring voltage, or c2) comparing a temperature ascertained on the basis of the measuring voltage registered in the course of measure b) with a set temperature for the purpose of ascertaining a temperature deviation between the ascertained temperature and the set temperature, and setting the supply voltage as a function of the temperature deviation in such a manner that the ascertained temperature lies within the range of the set temperature.

It should be pointed out that, by reason of the relationship between the registered measuring voltage and the electrical resistance of the measuring section or the temperature of the measuring section, the registering of the measuring voltage constitutes the basis for the ascertainment of the electrical resistance of the measuring section and consequently of the temperature of the measuring section. The setting or adjusting of the measuring voltage consequently results in a setting or adjusting of the electrical resistance and consequently of the temperature of the measuring section and hence substantially also of the temperature of the heating conductor.

In the course of measure c2), the temperature in the region of the measuring section can be ascertained by using a measuring-voltage/temperature relationship. This relationship may have been stored, for example in the form of a characteristic diagram or a functional relationship, so that by assignment to each value of the measuring voltage the temperature represented by this respective measuring voltage can be ascertained by reading out from the characteristic diagram or by calculation on the basis of a functional relationship and can optionally be compared with a set temperature.

The set temperature, or the set measuring voltage representing a set temperature, can preferably be predetermined as a function of ambient parameters such as, for example, the temperature of exhaust gas flowing through an exhaust-gas heater.

BRIEF DESCRIPTION OF THE DRAWINGS

The invention will now be described with reference to the drawings wherein.

DESCRIPTION OF THE PREFERRED EMBODIMENTS

Figure 1:
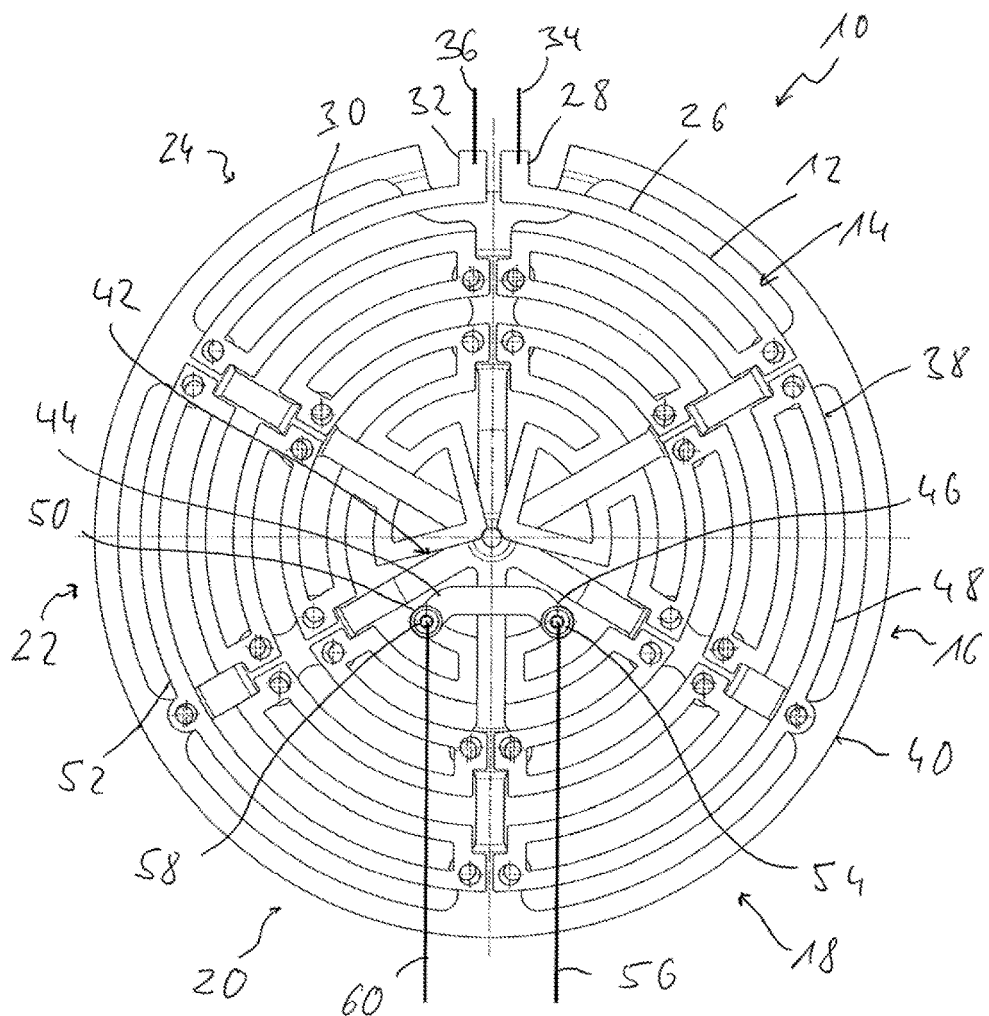
FIG. 1 shows an exhaust-gas heater with a heating conductor supported on a support arrangement and with a voltage-measuring section integrated into the heating conductor.

In FIG. 1, an exhaust-gas heater 10 is represented such as described—as regards its basic structure—in US 2022/0074333, for example. The exhaust-gas heater 10 includes a heating conductor 12—formed, for example, by being cut out from a metal plate—which, in the structure represented, has been constructed with six meandering winding fields 14, 16, 18, 20, 22, 24 succeeding one another in the circumferential direction around a central region. In each of the meandering winding fields 14, 16, 18, 20, 22, 24 respective meandering winding portions are situated in radially staggered manner with respect to one another and are connected in one of their circumferential end regions to a meandering winding portion following respectively in the radial direction.

At meandering winding field 14 the radially outermost meandering winding portion 26 provides a first supply-voltage terminal 28 in one of its circumferential end regions. Correspondingly, a radially outermost meandering winding portion 30 of meandering winding field 24 provides a second supply-voltage terminal 32 in one of its circumferential end regions. Respective voltage supply lines 34, 36, which may have been passed through an exhaust-gas-tight bushing in a—for example, tubular—exhaust-gas routing element containing the exhaust-gas heater 10, can be coupled to the two supply-voltage terminals 28, 32.

Between the two supply-voltage terminals 28, 32 the heating conductor 12 exhibits a heating region designated generally by 38 which, when an electrical voltage is applied to the supply-voltage terminals 28, 32, is heated by reason of the electric current flowing and is consequently able to transfer heat to exhaust gas flowing around the heating region 38.

The heating conductor 12, or the heating region 38 thereof, is supported on a support arrangement 40 which, for example, may include a support disk both on an upstream side and on a downstream side of the heating conductor 12, the disks being fastened radially on the outside to the, for example, tubular exhaust-gas routing element.

It is noted that the structure or the contour of the heating region 38 with the meandering winding fields 14, 16, 18, 20, 22, 24 is only exemplary. The heating region might also have a different structure, for example a spiral-like contour.

A measuring section, designated generally by 42, has been integrated into the heating region 38 of the heating conductor 12. In the embodiment represented in FIG. 1, the measuring section 42 includes a measuring resistor 44 which in a first terminal region 46 has been coupled—for example, by screwing, riveting, soldering, welding or such like—to a first heating-region portion 48 leading to the first supply-voltage terminal 28, and in a second terminal region 50 has been coupled in like manner to a second heating-region portion 52 leading to the second supply-voltage terminal 32. The heating region 38, with its two heating-region portions 48, 50, has consequently been constructed with two portions fundamentally separated physically from one another, which, however, are connected to one another in electrically conducting manner by the measuring resistor 44 which is coupled to them and consequently electrically connected in series with them.

In the region of the first terminal region 46 a first voltage-measuring terminal 54 has been provided, to which a first voltage-measuring line 56 is coupled. Equally, in the region of the second terminal region 50 a second voltage-measuring terminal 58 has been provided, to which a second voltage-measuring line 60 is coupled. The voltage-measuring lines 56, 60 may also have been passed through the exhaust-gas routing element through an exhaust-gas-tight bushing.

Figure 3:
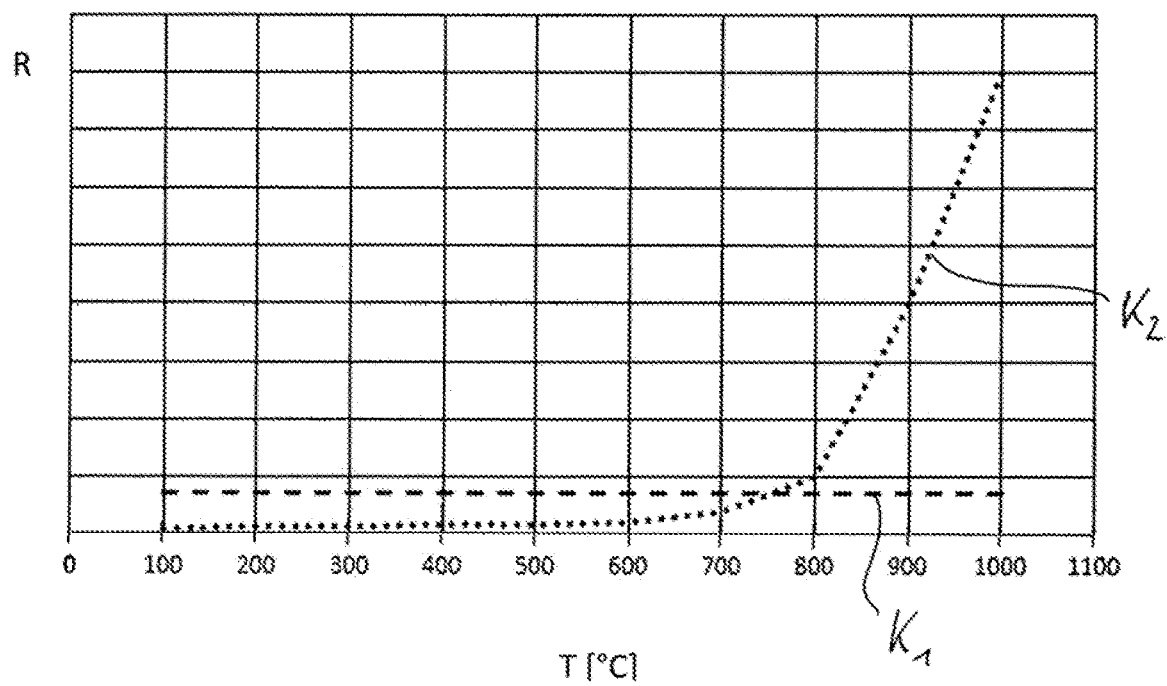
FIG. 3 shows a relationship between the temperature and the electrical resistance for the heating conductor and for a measuring resistor of a voltage-measuring section with PTC resistance characteristic.

The measuring resistor 44 of the voltage-measuring section 42 preferentially exhibits a resistance characteristic that differs from the resistance characteristic of the heating conductor 12. The heating conductor 12 has, for example, been constructed with a metallic material that, in principle, exhibits a comparatively low resistance and exhibits an approximately constant and only slightly rising electrical resistance within the temperature range in which the exhaust-gas heater 10 is to be operated—that is, up to a temperature of about 700° C. to 800° C. The measuring resistor 44 may be, for example, a PTC element with a PTC resistance characteristic. The resistance characteristics of the heating conductor 12 and of the measuring resistor 44 taking the form of a PTC element are illustrated schematically in FIG. 3. Discernible on the basis of a curve $K_1$ is the electrical resistance of the heating conductor 12, which changes only little within a comparatively wide temperature range. Curve $K_2$ illustrates schematically a PTC resistance characteristic of the measuring resistor 44. This characteristic is distinguished in that within a wide temperature range—in particular, the range that is relevant for normal operation of the exhaust-gas heater 10—it displays a distinctly lower electrical resistance than, for example, the heating conductor 12 but exhibits a more intense dependence of the electrical resistance on the temperature. With increasing temperature, the electrical resistance of the measuring resistor 44 rises exponentially and consequently also exceeds the electrical resistance of the heating conductor 12.

With such a temperature/resistance characteristic of the heating conductor 12, on the one hand, and of the measuring resistor 44, on the other hand, various advantages are obtained. On the one hand, by virtue of the comparatively low electrical resistance of the measuring resistor 44 or of the measuring section 42 within the temperature range in which the exhaust-gas heater 10 is normally operated, it is ensured that only a comparatively slight fall in voltage, and consequently also a comparatively low heating power, occurs in the measuring resistor 44 connected in series with the two heating-region portions 48, 52. The measuring resistor 44 consequently generates comparatively little heat itself, so the temperature thereof will have been substantially determined by the temperature of the heating conductor 12 or of the two heating-region portions 48, 52 physically connected to the measuring resistor 44. On the other hand, the electrical resistance of the measuring resistor 44 changes comparatively intensely with temperature, so even comparatively small changes in temperature result in a distinct change in the electrical resistance and consequently in the electrical voltage falling along the measuring resistor 44. This fall or drop in voltage can be registered as a measuring voltage via the voltage-measuring lines 56, 60, and consequently provides a direct inference of the temperature of the measuring resistor 44 and consequently substantially also of the temperature of the heating region 38 adjoining it.

Another advantage of the PTC resistance characteristic of the measuring resistor 44 is that in the case of a temperature rising excessively the electrical resistance of the measuring resistor 44 also rises considerably. By reason of the series connection of the measuring resistor 44 with the two heating-region portions 48, 52, a sharply rising electrical resistance of the measuring resistor 44 has the consequence that a comparatively small current will also flow through them, with the consequence that the heating power of the entire exhaust-gas heater 10 is throttled in the case of an excessively rising temperature. With this resistance characteristic, a self-regulating effect can accordingly be obtained which ensures that, by reason of the sharply increasing electrical resistance with rising temperature, the heating power decreases correspondingly. For example, by virtue of the choice of the construction material of the measuring resistor 44 there may be provision that, in the case of an operating-temperature range that extends up to about 700° C. to 800° C., in the event of a further rise in temperature in the region of the measuring section 42 such a considerable rise in the electrical resistance of the measuring resistor 44 occurs that the heating power of the exhaust-gas heater 10 at a temperature of about 900° C. is only very low, for example, is almost zero.

Figure 6:
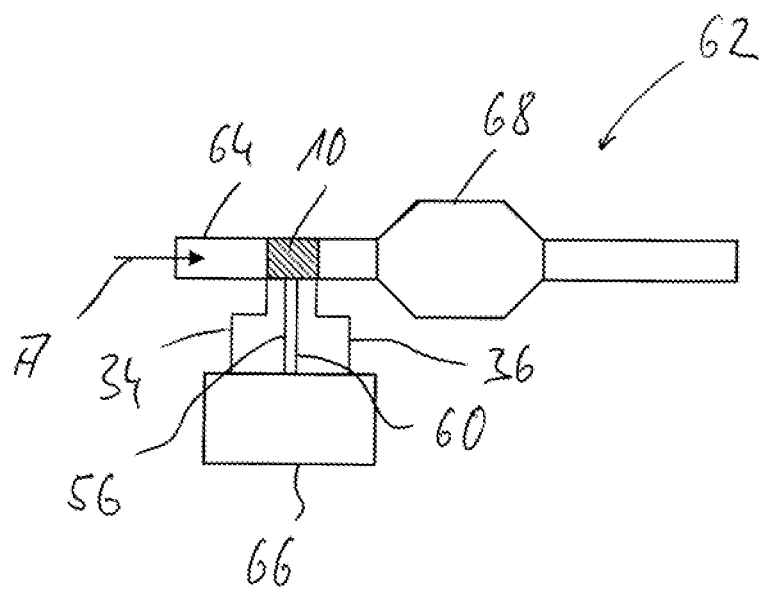

FIG. 6 illustrates an exhaust system, designated generally by 62, for an internal combustion engine, for example in a motor vehicle. The exhaust system 62 includes a tubular exhaust-gas routing element 64 in which exhaust gas A is flowing toward the exhaust-gas heater 10 arranged in the exhaust-gas routing element 64. The supply-voltage terminals 28, 32 of the heater are coupled to a control arrangement 66 via the supply lines 34, 36, so that a supply voltage can be applied to the supply-voltage terminals 28, 32 of the heating conductor 12 by the control arrangement 66, for example on the basis of the on-board voltage that is present in a vehicle.

The voltage-measuring terminals 54, 58, or the voltage-measuring lines 56, 60 leading away therefrom, are also coupled to the control arrangement 66, so that the drop in voltage along the measuring resistor 44 can be registered in the control arrangement 66. By virtue of a relationship stored in the control arrangement 66, for example in the form of a characteristic diagram or a functional relationship, between the drop in voltage between the two voltage-measuring terminals 54, 58—that is, the measuring voltage registered along the measuring resistor 44—and the electrical resistance of the measuring resistor 44 or a temperature, represented by the electrical resistance of the measuring resistor 44, in the region of the measuring resistor 44 or of the measuring section 42, it consequently becomes possible to provide information about this temperature or, generally, the temperature in the region of the heating region 38 of the heating conductor 12.

The control arrangement 66 may have been configured to set or to adjust the temperature of the heating region 38 or of the exhaust-gas heater 10 to a set temperature that is dependent on, for example, the exhaust-gas temperature. This can be done, for example, by an actual temperature in the region of the measuring resistor 44 being ascertained on the basis of the measuring voltage registered along the measuring resistor 44 and on the basis of the known relationship between this measuring voltage and the electrical resistance of the measuring resistor 44 and consequently the temperature in the region of the measuring resistor 44, and being compared with the set temperature. Depending on the deviation between the actual temperature and the set temperature, the supply voltage applied to the supply-voltage terminals 28, 32 can then be varied, in order consequently to ensure in a control procedure that the actual temperature lies within the range of the set temperature.

Since there is a direct relationship between the drop in voltage along the measuring resistor 44—that is, the measuring voltage—and the electrical resistance of the measuring resistor 44 and consequently also the temperature in the region of the measuring resistor 44, it is, however, not absolutely essential to convert the measuring voltage into a temperature. Rather, a set measuring voltage which, for example, can be varied in a manner depending on the exhaust-gas temperature, can also be predetermined in the control arrangement 66. This set measuring voltage can be compared with the measuring voltage registered along the measuring resistor 44—that is, an actual measuring voltage—so that the supply voltage applied to the supply-voltage terminals 28, 32 can then also be varied as a function of the value between the set measuring voltage and the actual measuring voltage, in order to ensure that the exhaust-gas heater 10 can be operated at an optimal heating power, for example for an exhaust-gas temperature that is present in the given case or, for example, for a temperature in the region of an exhaust-gas treatment unit 68, for example a catalytic-converter arrangement, following the exhaust-gas heater 10 in the direction of flow of exhaust gas.

It is further noted that the predetermining of a set measuring voltage or the predetermining of a set measuring temperature is equivalent to the predetermining of a set resistance for the measuring resistor 44. On the basis of the measuring voltage, by reason of the generally known relationship of the drop in voltage along the measuring resistor 44 with the electrical resistance thereof, by varying the supply voltage at the supply-voltage terminals 28, 32 the electrical resistance of the measuring resistor 44 can be set in such a way that it corresponds to the set resistance. Since the measuring voltage, the electrical resistance of the measuring resistor 44 and the temperature in the region of the measuring resistor 44 are physical quantities corresponding to one another or unambiguously related to one another, each of these quantities can be drawn upon as a basis for the registration or control of the temperature, or the use of one of these quantities as a control variable also means, equally, that the other quantities unambiguously related to it constitute a basis for the setting or control of the temperature of the exhaust-gas heater 10.

Figure 2:
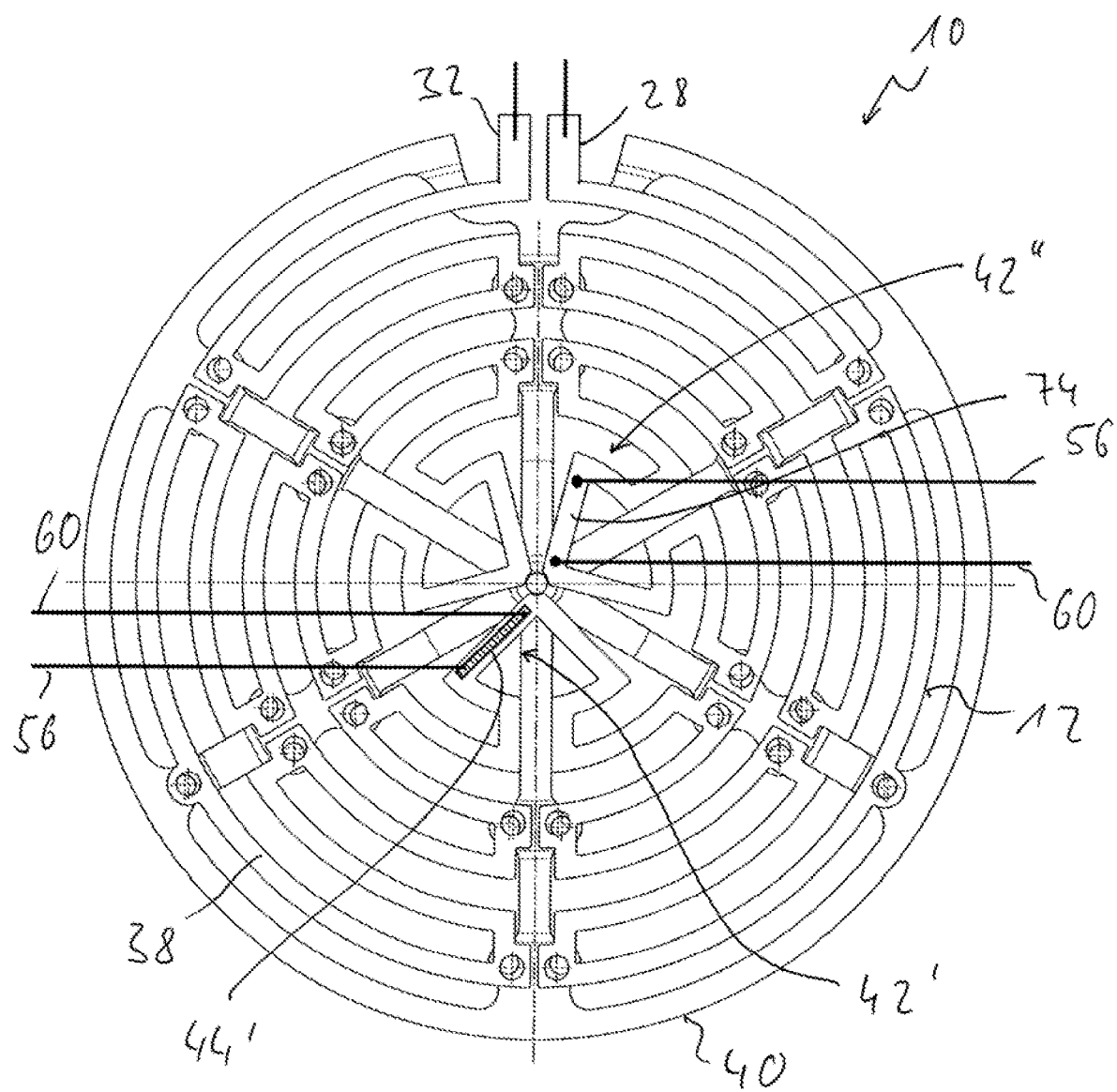
FIG. 2 shows a view of an exhaust-gas heater, corresponding to FIG. 1, in which two different alternative configurations of a voltage-measuring section integrated into the heating conductor are represented.

In FIG. 2, alternative configurations of the exhaust-gas heater 10, in particular with two alternatively configured measuring sections 42' and 42", are represented. In the configuration of the measuring section 42 represented on the left in FIG. 2, which is also illustrated schematically in FIG. 4, the measuring section includes a measuring resistor 44' not physically incorporated into the heating region 38 of the heating conductor 12, but rather a measuring resistor 44' extending along a portion 70 of the heating region 38 and electrically insulated with respect to the heating region 38 by insulating material 72. However, the measuring resistor 44' is in heat-transfer contact with the heating region 38 of the heating conductor 12 via the electrically insulating insulating material 72. This insulating material 72 may include, for example, temperature-resistant adhesive or, in the case of a measuring resistor 44' contained in an insulating sheath, also soldering material or welding material.

Voltage-measuring terminals 54, 58 have been formed at both ends of the measuring resistor 44', to which the voltage-measuring lines 56, 60 are coupled. Via the voltage-measuring lines 56, 60, the drop in voltage occurring along the measuring resistor 44'—that is, a measuring voltage—can be registered, which in turn has an unambiguous relationship with the temperature of the measuring resistor 44'. For example, in such a configuration the measuring resistor may take the form of a so-called Pt100 platinum resistor which, particularly within a temperature range up to about 800° C., exhibits a substantially linear but distinct rise in the electrical resistance with temperature.

By virtue of the integration of the measuring section 42' into the heating conductor 12 in such a manner that although the measuring section is in thermal contact with the heating conductor it exhibits no electrically conducting interaction therewith, the heating conductor 12, or the heating region 38 thereof, is capable of being utilized substantially within the entire longitudinal portion for the purpose of transferring heat to the exhaust gas A flowing around it.

Figure 4:
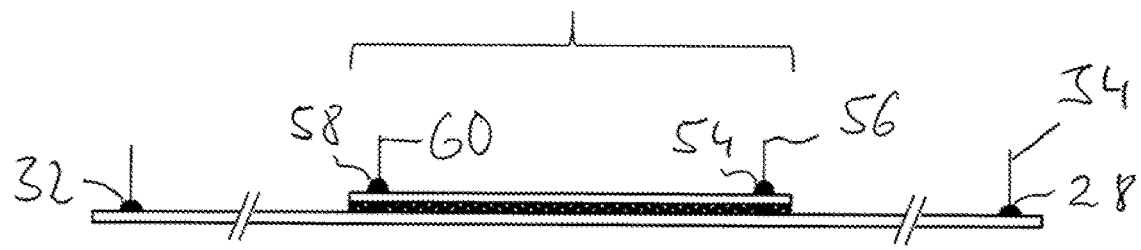
FIG. 4 shows a side view of a heating conductor with a voltage-measuring section represented in the left half of FIG. 2.

It should be pointed out that also in the configuration represented in FIG. 4 the measuring resistor 44' of the measuring section 42' might of course exhibit a different resistance characteristic, for example the PTC resistance characteristic described in the foregoing with reference to the embodiment shown in FIG. 1. However, since in this configuration there is no electrical interaction between the measuring resistor 44' and the heating conductor 12, the self-regulating effect by reason of the sharply rising electrical resistance in the case of a PTC element might not be utilized. But on the basis of the monitoring of the temperature in the region of the measuring section 42' it can be ensured by the control arrangement 66 by appropriate control measures that the temperature of the heating conductor 12 does not exceed an upper threshold temperature.

Figure 5:
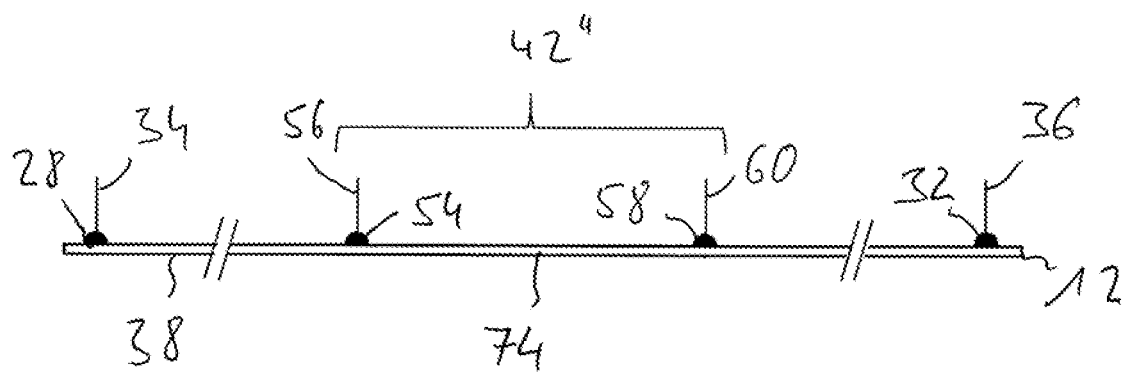
FIG. 5 shows a side view of a heating conductor with a voltage-measuring section represented in the right half of FIG. 2; and, FIG. 6 shows, in schematic representation, an exhaust system with an exhaust-gas heater and with a voltage-measuring section integrated into the exhaust-gas heater.

In the embodiment of an exhaust-gas heater 10 illustrated on the right in FIG. 2 and in FIG. 5, the measuring section 42" includes a portion 74 of the heating region 38 of the heating conductor 12. The voltage-measuring terminals 54, 58 have been formed on the heating region 38 by, for example, attaching the voltage-measuring lines 56, 60 by soldering or welding. Since, in principle, as illustrated on the basis of curve $K_1$ in FIG. 3, the heating region 38 also exhibits an electrical resistance changing with temperature, the electrical resistance of the portion 74, and consequently the temperature thereof, can be inferred by registering the fall in voltage—that is, a measuring voltage—between the two voltage-measuring terminals 54, 58. Since the fall in voltage occurring between the voltage-measuring terminals 54, 58 depends on the electrical resistance of the portion 74, and the electrical resistance of the portion 74 depends on its length, for a registration of the measuring voltage, or of the variation of the measuring voltage, that is as precise as possible it may be advantageous to arrange the voltage-measuring terminals 54, 58 as far away from one another as possible along the heating region 38. For example, these terminals might also have been provided in the region of the supply-voltage terminals 28, 32.

With the structure, according to the disclosure, of an exhaust-gas heater, the possibility is created of monitoring the temperature in the region of the exhaust-gas heater, or of the heating conductor thereof, and of setting or adjusting it to a value that is particularly advantageous for a respective operation of an internal combustion engine and consequently, in particular, also for the exhaust-gas temperature or even the temperature of an exhaust-gas treatment unit following downstream. Various types of measuring section may be employed for this purpose. If the measuring section includes a measuring resistor provided as a separate component, the latter may have been constructed with various resistance characteristics. A PTC resistance characteristic is particularly advantageous, since this brings about a self-regulating effect of the heating power or of the temperature of the exhaust-gas heater 10 in the event of an excessive rise in temperature. However, measuring resistors with other resistance characteristics, for example with an NTC resistance characteristic or with a substantially linear resistance characteristic, such as is generally present in metals, may also be employed.

It is understood that the foregoing description is that of the preferred embodiments of the invention and that various changes and modifications may be made thereto without departing from the spirit and scope of the invention as defined in the appended claims.

What is claimed is:

1. An exhaust-gas heater for an exhaust system for an internal combustion engine, the exhaust-gas heater comprising:
    a heating conductor having a first supply-voltage terminal and a second supply-voltage terminal;
    said heating conductor defining a heating region extending between said first and said second supply-voltage terminals;
    a voltage-measuring section integrated into said heating region including a measuring resistor, said voltage-measuring section exhibiting a resistance characteristic different from a resistance characteristic of said heating region;
    said heating region defining first and second heating-region portions;
    said measuring resistor having first and second terminal regions connected to said first and second heating-region portions, respectively, leading to corresponding ones of said first and second supply-voltage terminals; and,
    said measuring resistor being electrically connected in series with said first heating-region portion and with said second heating-region portion;
        wherein at least one of the following applies:
        said voltage-measuring section exhibits an electrical resistance changing with greater intensity in a temperature-dependent manner than said heating region within an operating temperature range; and said voltage-measuring section exhibits a lower electrical resistance than said heating region within said operating temperature range.

2. The exhaust-gas heater of claim 1, wherein said measuring resistor further includes a first voltage-measuring terminal formed thereon in a region of said first terminal region and a second voltage-measuring terminal formed thereon in a region of said second terminal region.

3. The exhaust-gas heater of claim 1, wherein the voltage-measuring section exhibits a PTC resistance characteristic or an NTC resistance characteristic.

4. An exhaust-gas heating system for an exhaust system for an internal combustion engine, the exhaust-gas heating system comprising:
at least one exhaust-gas heater for accommodating a flow of exhaust gas (A) therethrough;
said exhaust-gas heater including:
a heating conductor having a first supply-voltage terminal and a second supply-voltage terminal;
said heating conductor defining a heating region extending between said first and said second supply-voltage terminals;
a voltage-measuring section exhibiting a resistance characteristic different from a resistance characteristic of said heating region and being integrated into said heating region;
said voltage-measuring section including:
a measuring resistor;
said heating region defining first and second heating-region portions;
said measuring resistor having first and second terminal regions connected to said first and second heating-region portions, respectively, leading to corresponding . . . ones of said first and second supply-voltage terminals;
said measuring resistor being electrically connected in series with said first heating-region portion and with said second heating-region portion;
said measuring resistor further including a first voltage-measuring terminal formed thereon in a region of said first terminal region and a second voltage-measuring terminal formed thereon in a region of said second terminal region;
said exhaust-gas heating system further including:
a control arrangement for registering a measuring voltage between said first and second voltage-measuring terminals and for applying a supply voltage between said first and second supply-voltage terminals as a function of the registered measuring voltage;
wherein at least one of the following applies:
said voltage-measuring section exhibits an electrical resistance changing with greater intensity in a temperature-dependent manner than said heating region within an operating temperature range; and,
said voltage-measuring section exhibits a lower electrical resistance than said heating region within said operating temperature range.

5. The exhaust-gas heating system of claim 4, wherein said control arrangement is configured to apply the supply voltage to said first and second supply-voltage terminals as a function of the registered measuring voltage and a set measuring voltage or a set temperature in the region of said voltage-measuring section.

6. An exhaust system for an internal combustion engine, the exhaust system comprising:
an exhaust-gas heating system including:
at least one exhaust-gas heater for accommodating a flow of exhaust gas (A) therethrough;
said exhaust-gas heater including:
a heating conductor having a first supply-voltage terminal and a second supply-voltage terminal;
said heating conductor defining a heating region extending between said first and said second supply-voltage terminals;
a voltage-measuring section exhibiting a resistance characteristic different from a resistance characteristic of said heating region and being integrated into said heating region;
said voltage-measuring section including:
a measuring resistor;
said heating region defining first and second heating-region portions;
said measuring resistor having first and second terminal regions connected to said first and second heating-region portions, respectively, leading to corresponding ones of said first and second supply-voltage terminals;
said measuring resistor being electrically connected in series with said first heating-region portion and with said second heating-region portion;
said measuring resistor further including a first voltage-measuring terminal formed thereon in a region of said first terminal region and a second voltage-measuring terminal formed thereon in a region of said second terminal region;
said exhaust-gas heating system further including:
a control arrangement for registering a measuring voltage between said first and second voltage-measuring terminals and for applying a supply voltage between said first and second supply-voltage terminals as a function of the registered measuring voltage;
wherein at least one of the following applies:
said voltage-measuring section exhibits an electrical resistance changing with greater intensity in a temperature-dependent manner than said heating region within an operating temperature range; and,
said voltage-measuring section exhibits a lower electrical resistance than said heating region within said operating temperature range.

7. A method for operating an exhaust-gas heater including: a heating conductor having a first supply-voltage terminal and a second supply-voltage terminal; said heating conductor defining a heating region extending between said first and said second supply-voltage terminals; a voltage-measuring section exhibiting a resistance characteristic different from a resistance characteristic of said heating region and being integrated into said heating region; said voltage-measuring section including:
a measuring resistor, said heating region defining first and second heating-region portions, said measuring resistor having first and second terminal regions connected to said first and second heating-region portions, respectively, leading to corresponding ones of said first and second supply-voltage terminals, said measuring resistor being electrically connected in series with said first heating-region portion and with said second heating-region portion, and, said measuring resistor further including a first voltage-measuring terminal formed thereon in a region of said first terminal region and a second voltage-measuring terminal formed thereon in a region of said second terminal region;
wherein at least one of the following applies:
said voltage-measuring section exhibits an electrical resistance changing with greater intensity in a temperature-dependent manner than said heating region within an operating temperature range; and, said voltage-measuring section exhibits a lower electrical resistance than said heating region within said operating temperature range;

the method comprising:

a) applying a supply voltage between the first supply-voltage terminal and the second supply-voltage terminal;

b) registering a measuring voltage between said first voltage-measuring terminal of said voltage-measuring section and said second voltage-measuring terminal of said voltage-measuring section; and, c) carrying out one of the following steps:

c1) comparing the measuring voltage registered in the course of step b) with a set measuring voltage to ascertain a voltage deviation between the registered measuring voltage and the set measuring voltage, and setting the supply voltage as a function of the voltage deviation in such a manner that the registered measuring voltage lies within the range of the set measuring voltage, or c2) comparing a temperature ascertained on the basis of the measuring voltage registered in the course of step b) with a set temperature for the purpose of ascertaining a temperature deviation between the ascertained temperature and the set temperature, and setting the supply voltage as a function of the temperature deviation in such a manner that the ascertained temperature lies within the range of the set temperature.

8. The method of claim 7, wherein in the course of step c2), the temperature in the region of the measuring section is ascertained by using a measuring-voltage/temperature relationship.

9. The method of claim 7, wherein the set measuring voltage or the set temperature is predetermined as a function of at least one ambient parameter.

10. The method of claim 9, wherein an exhaust-gas temperature of exhaust gas (A) flowing through the exhaust-gas heater is an ambient parameter.

* * * * *